US012809079B2

(12) United States Patent
Chen et al.

(10) Patent No.: US 12,809,079 B2
(45) Date of Patent: Nov. 24, 2026

(54) AREA LIGHT SOURCE DEVICE AND FLAT PANEL DISPLAY DEVICE

(71) Applicant: SUZHOU CRYSTALENT CO., LTD., Jiangsu (CN)

(72) Inventors: Yimin Chen, Jiangsu (CN); Peng Wu, Jiangsu (CN); Tong Li, Jiangsu (CN); Shujin Zhou, Jiangsu (CN)

(73) Assignee: SUZHOU CRYSTALENT CO., LTD., Jiangsu (CN)

( * ) Notice: Subject to any disclaimer, the term of this patent is extended or adjusted under 35 U.S.C. 154(b) by 0 days.

(21) Appl. No.: 18/285,858

(22) PCT Filed: Apr. 1, 2022

(86) PCT No.: PCT/CN2022/084746
§ 371 (c)(1),
(2) Date: Oct. 5, 2023

(87) PCT Pub. No.: WO2022/233207
PCT Pub. Date: Nov. 10, 2022

(65) Prior Publication Data

US 2024/0192430 A1 Jun. 13, 2024

(30) Foreign Application Priority Data

May 6, 2021 (CN) ......................... 202110490178.9

(51) Int. Cl.
*F21V 8/00* (2006.01)

(52) U.S. Cl.
CPC .................................... *G02B 6/005* (2013.01)

(58) Field of Classification Search
CPC ...................................................... G02B 6/005
See application file for complete search history.

(56) References Cited

U.S. PATENT DOCUMENTS 5,995,690 A 11/1999 Kotz et al.
2015/0003104 A1* 1/2015 Huang .................. G02B 6/005 362/613

(Continued)

FOREIGN PATENT DOCUMENTS

CN 1766704 5/2006
CN 109031512 12/2018

(Continued)

OTHER PUBLICATIONS

"International Search Report (Form PCT/ISA/210) of PCT/CN2022/084746", mailed on Jun. 29, 2022, with English translation thereof, pp. 1-6.

*Primary Examiner* — Evan P Dzierzynski
*Assistant Examiner* — Jessica M Apenteng
(74) *Attorney, Agent, or Firm* — JCIPRNET

(57) ABSTRACT

The invention discloses an area light source device comprises: a light guide body comprising an incidence plane, a front exit plane and a rear exit plane which extend along two opposite sides of the incidence plane; a light emitting body disposed along a side of the incidence plane of the light guide body; a structural layer disposed on one side of the rear exit plane, and used for changing the direction of light from the light guide body to the structural layer and emitting the light in a direction away from the rear exit plane; and second medium layers wrapped in the structural layer, wherein the refractive index of a material of the second medium layers is less than the refractive index of a material of the structural layer. The invention further discloses a flat panel display device.

12 Claims, 2 Drawing Sheets

(56) References Cited

U.S. PATENT DOCUMENTS

| | | | | |
|---|---|---|---|---|
| 2015/0226898 | A1* | 8/2015 | Shih | G02B 6/005 362/608 |
| 2015/0338052 | A1* | 11/2015 | Chen | F21V 5/007 362/333 |
| 2015/0378084 | A1* | 12/2015 | Lue | G02B 6/005 362/607 |
| 2019/0094450 | A1* | 3/2019 | Bae | G02B 6/0036 |
| 2019/0293839 | A1 | 9/2019 | Lee et al. | |
| 2020/0073044 | A1* | 3/2020 | Wang | G02B 6/0055 |

FOREIGN PATENT DOCUMENTS

| | | |
|---|---|---|
| CN | 209102945 | 7/2019 |
| CN | 110308512 | 10/2019 |
| CN | 110737042 | 1/2020 |
| CN | 111295606 | 6/2020 |

* cited by examiner

AREA LIGHT SOURCE DEVICE AND FLAT PANEL DISPLAY DEVICE

CROSS-REFERENCE TO RELATED APPLICATION

This application is a 371 of international application of PCT application serial no. PCT/CN2022/084746, filed on Apr. 1, 2022, which claims the priority benefit of China application no. 202110490178.9, filed on May 6, 2023. The entirety of each of the above mentioned patent applications is hereby incorporated by reference herein and made a part of this specification.

TECHNICAL FIELD

The invention belongs to the technical field of liquid crystal display, and relates to an area light source device and a flat panel display device, in particular to a reflective or transmissive type liquid crystal display device.

DESCRIPTION OF RELATED ART

At present, low-power display has become a trend, which in turn promotes the emergence of reflective and transmissive type liquid crystal displays, which are low in power, and have the advantages of being light, thin and miniaturized. However, such liquid crystal displays have the defect that the display brightness will be decreased in dark environments, compromising the viewing experience. To solve this problem, a front light source is often disposed in a module. Due to the particularity of the usage scenario, the front light source should have a high transparency and contrast to ensure that users can see bright and clear images.

Chinese Patent Application No. CN109031512A discloses a light guide film, which is a trapezoidal structure, wherein the guide film is bonded on a light guide plate and is equivalent to an inverted trapezoidal structure on the surface of the light guide plate; when emitted to the side face of the inverted trapezoidal structure, light will be diverged and totally reflected out from the bottom surface of the trapezoidal structure. However, due to the existence of an air gap, after natural light in the outside reaches the light guide film, a high reflection rate of the system will be caused by multiple layers of interfaces, resulting to an excessively low contrast of the screen.

Therefore, it is necessary to provide a novel light source structure to solve this problem.

BRIEF SUMMARY OF THE INVENTION

The objective of the invention is to provide an area light source device and a liquid crystal display device to solve the problem of the low contrast of front light sources in the prior art.

To fulfill the above objective, one embodiment of the invention provides the following technical solution.

In one embodiment, an area light source device comprises:

a light guide body comprising an incidence plane, and a front exit plane and a rear exit plane extending along two opposite sides of the incidence plane respectively;

a light emitting body disposed along a side of the incidence plane of the light guide body;

a structural layer disposed on one side of the rear exit plane, and used for changing the direction of light from the light guide body to the structural layer and emitting the light in a direction away from the rear exit plane; and second medium layers wrapped in the structural layer, the refractive index of a material of the structural layer being greater than the refractive index of a material of the second medium layers.

Preferably, in the area light source device, the refractive index of the material of the structural layer is 1.65, and the refractive index of the second medium layers is 1.33.

Preferably, the area light source device further comprises a first medium layer disposed between the rear exit plane and the structural layer, and the refractive index of a material of the light guide body is greater than or equal to the refractive index of a material of the first medium layer.

Preferably, in the area light source device, the refractive index of the material of the light guide body is 1.58, and the refractive index of the material of the first medium layer is 1.48.

Preferably, in the area light source device, the cross-section of each of the second medium layers perpendicular to a plane direction of the structural layer is a trapezoid, an edge, close to the light guide body, of the trapezoid is a long edge, and an edge, away from the light guide body, of the trapezoid is a short edge.

Preferably, in the area light source device, the light guide body comprises a reflection plane opposite to the incidence plane, an angle between the reflection plane and the rear exit plane is an acute angle, and the light guide body further comprises a reflector is disposed along a side of the reflection plane.

Preferably, in the area light source device, multiple structural layers are stacked on one side of the rear exit plane, and the structural layers are used for changing the direction of light from the light guide body to the structural layers, and emitting the light in the direction away from the rear exit plane; second medium layers are wrapped in each of the structural layers, and the refractive index of a material of the structural layers is greater than the refractive index of a material of the second medium layers.

Preferably, in the area light source device, the cross-section of each of the second medium layers perpendicular to a plane direction of the structural layers is rectangular.

Preferably, in the area light source device, first medium layers are disposed between the adjacent structural layers, as well as between the light guide body and the structural layer, and the refractive index of a material of the light guide body is greater than the refractive index of a material of the first medium layers.

In one embodiment, a flat panel display device comprises:

the area light source device; and a flat panel display panel disposed on one side of a rear exit plane.

Compared with the prior art, in view of the problem of the low contrast of existing front light sources, the second medium layers are wrapped in the structural layer with a certain refractive index in the invention, and a structural solution for refractive index matching is provided to remarkably improve the contrast, such that the visual effect of the existing front light sources is improved.

BRIEF DESCRIPTION OF ACCOMPANYING DRAWINGS

To more clearly describe the technical solutions of the embodiments of the application or the prior art, drawings used for describing the embodiments of the application or the prior art will be briefly introduced below. Obviously, the drawings in the is following description merely illustrate some embodiments of the application, and those ordinarily skilled in the art can obtain other drawings according to the following ones without creative labor.

DETAILED DESCRIPTION OF THE INVENTION

The invention will be described in detail below in conjunction with the embodiments illustrated by the accompanying drawings, but these embodiments are not used to limit the invention. All transformations of these embodiments made by those ordinarily skilled in the art in structure, method or function should fall within the protection scope of the invention.

Figure 1:
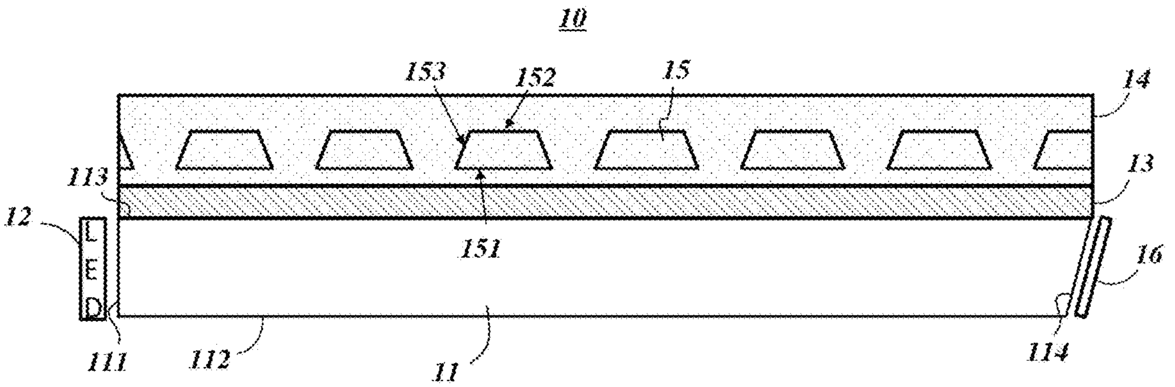
FIG. 1 is a schematic structural diagram of an area light source device in a first embodiment of the present application.

As shown in FIG. 1, an embodiment of the present application provides an area light source device 10, comprising a light guide body 11 and a light emitting body 12 for emitting light to the light guide body 11. The area light source device 10 further comprises a first medium layer 13, a structural layer 14 and second medium layers 15 which are sequentially disposed on one side of a rear exit plane of the light guide body 11, and the second medium layers are wrapped in the structural layer 14. The structural layer is used for changing the direction of light from the light guide body to the structural layer, and emitting the light in a direction away from the rear exit plane.

The light guide body 11 is mainly used for transmitting and emitting light, is preferably a flat plate structure, and comprises an incidence plane 111, a front exit plane 112 and a rear exit plane 113 which extend along two opposite sides of the incidence plane 111 respectively, and a reflection plane 114 opposite to the incidence plane 111, wherein the front exit plane 112 and the rear exit plane 113 are arranged in parallel, and an angle between the reflection plane 114 and the rear exit plane 113 is an acute angle.

A reflector 16 is disposed on one side of the reflection plane 114, and the reflector 16 is a membrane with a certain refractive index.

The light guide body 11 is preferably made of a material with a low internal light absorptivity, such as an acrylic acid sheet, and the material preferably comprises acrylate, polymethyl methacrylate (PMMA), polycarbonate (PC), polyethylene, optical glass, and the like.

The light guide body 11 may be in any suitable shapes, including, but not limited to, a plate shape. For example, the light guide body 11 may be a wedge-shaped plate or other structures, and the invention is not limited thereto.

The light emitting body 12 is arranged along a side of the incidence plane 111 of the light guide body 11. The light emitting body 12 is a linear light source, such as a light bar formed by multiple LED lights. Light emitted by the light emitting body 12 enters the light guide body 11 through the incidence plane 111 of the light guide body 11, and by designing the angle of emitted light of the light emitting body 12, most of the light can be totally reflected in the light guide body 11.

The first medium layer 13 is made of an optical material, the refractive index n2 of the light guide body 11 is greater than or equal to the refractive index n3 of the first medium layer 13, and satisfies 1<n3<n2. In a preferred embodiment, the first medium layer 13 is bonded on the rear exit plane 113 of the light guide body 11 with an adhesive.

The structural layer 14 is made of an optical material. In a preferred embodiment, the structural layer 14 is bonded on the surface of the first medium layer 13 with an adhesive.

Multiple cavities are formed in the structural layer 14 in a plane direction of the structural layer 14, and each of the cavities is filled with one second medium layer 15. The second medium layers 15 may be, but not limited thereto, liquid or gel with optical properties such as water, silica gel or UV gel. The refractive index n4 of the structural layer 14 is greater than the refractive index n5 of the second medium layers 15, and satisfies 1<n5<n4.

During production, multiple strip-shaped channels are machined in the structural layer 14 in the plane direction of the structural layer 14, then the channels are filled with liquid or gel with a certain refractive index. Finally, the entire structural layer 14 is bonded on the surface of the first medium layer 13.

In a preferred embodiment, the cross-section of the second medium layers 15 perpendicular to the plane direction of the structural layer 14 is a trapezoid. An edge, close to the light guide body 11, of the trapezoid is a long edge 151, and an edge, away from the light guide body 11, of the trapezoid is a short edge 152. More preferably, the cross-section of the second medium layers is an isosceles trapezoid.

Figure 2:
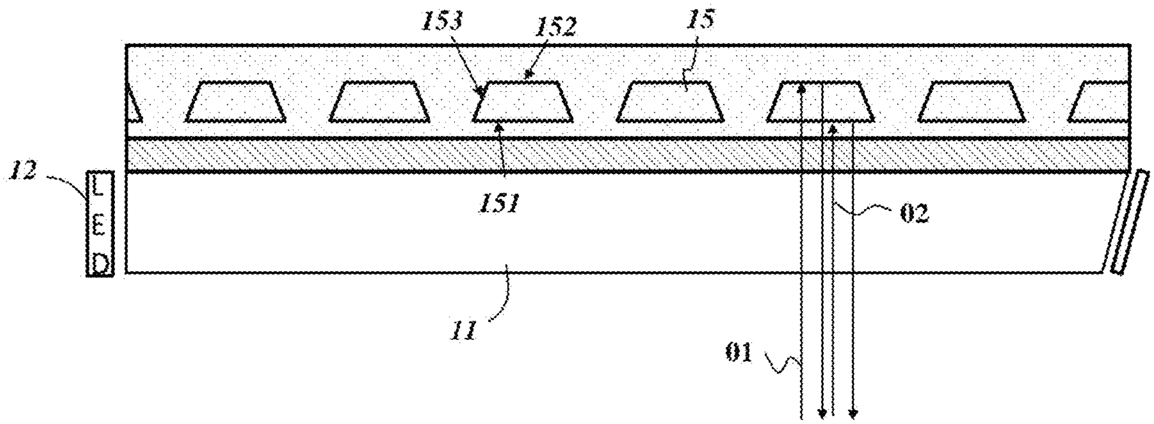
FIG. 2 is a schematic diagram of an optical path of vertically incident lights in the first embodiment of the present application.

In conjunction with FIG. 2, in one specific embodiment, the refractive index n2 of the light guide body 11 is 1.58, the refractive index n3 of the first medium layer 13 is 1.48, the refractive index n4 of the structural layer 14 is 1.65, and the refractive index n5 of the second medium layers 15 is 1.33. When the front light source is turned off, contrast and darkness are mainly caused by the incidence of natural light. Take vertically incident lights 01 and 02 as an example, the reflectivity of the vertically incident lights is $R=(n1-n2)^2/(n1+n2)^2$ according to Fresnel's law of reflection. Due to the fact that the difference between the refractive indexes of the other layers is small, interface reflection can be ignored, that is, the reflected light is mainly from a gap of the structural layer. If the second medium layers 15 are air, the refractive index will be 1, and the reflectivity of the lights on the long edge 151 and the short edge 152 will be 6%; or, if the refractive index of the second medium layers 15 is 1.33, the reflectivity will be as low as 1.2%. The brightness caused by interface reflection is greatly reduced.

Figure 3:
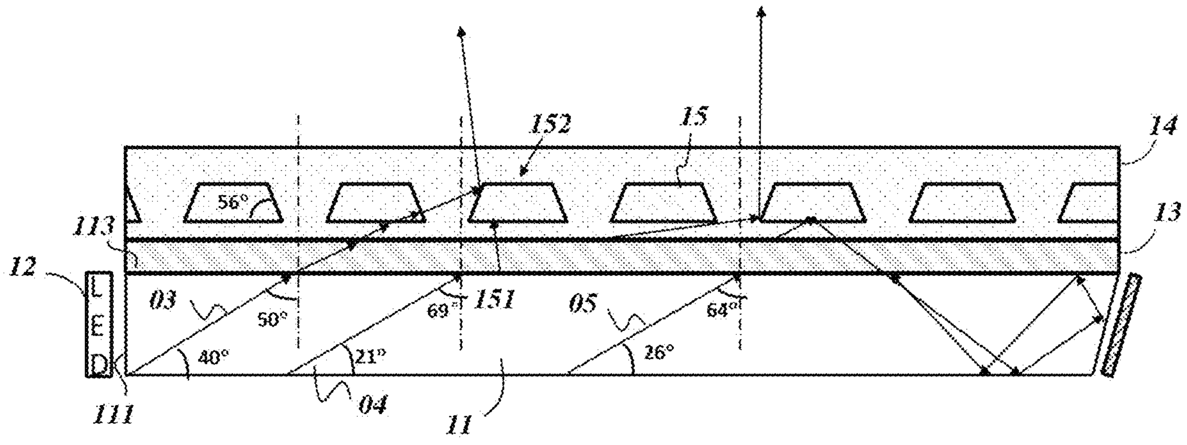
FIG. 3 is a schematic diagram of an optical path of lights incident on the incidence plane in the first embodiment of the present application.

Further, as shown in FIG. 3, optical path tracks are provided in which the lights pass through the light guide body 11, the first medium layer 13, the structural layer 14, and the second medium layers 15 in sequence.

An angle of dip β of the second medium layers 15 is 56°, and the cross-section of the second medium layers 15 is an isosceles trapezoid structure. Lights enter the light guide body 11 through the incidence plane 111 of the light guide body 11, and propagate in the light guide body 11 according to Snell's law of refraction:

$$N1 \sin \theta 1 = N2 \sin \theta 2$$

wherein N1 is the refractive index of a medium 1, θ1 is the angle of incidence, N2 is the refractive index of a medium 2, and θ2 is the angle of refraction.

The principle of this embodiment is as follows: after lights enter the light guide body 11 through the incidence plane 111, the angle of the lights is α=±arcsin (1/1.58)=±40°, the angle of total reflection of the light guide body 11 and the first medium layer 13 is γ=arcsin (1.48/1.58)=69.5°. Wherein, a light 03 enters the light guide body 11 at an angle of 40°, reaches the rear exit plane 113 at an angle of 50°, then exits the rear exit plane 113 and enters the structural layer 14 through the first medium layer 13, and reaches the long edge 151 at an angle of 47°. Because the cavities of the structural layer 14 are filled with the second medium layers 15, the second medium layers 15 are located between the long edges 151 and the short edges 152, and the refractive index is 1.33. Lights will be totally reflected by an angle of 540 after entering the second medium layer 15 with the refractive index of 1.33 from the structural layer 14 with the refractive index of 1.65, so the light 03 can exit. The light 03 enters a side face 153 of the second medium layer 15 at an angle of 60°, which is greater than the angle of total reflection, so the light 03 is totally reflected, and exits the surface of the structural layer 14 at a small angle, and a collimating effect is realized. A light 04 reaches the rear exit plane 113 at an angle of 69°, exits the exit plane 113, then exactly reaches the side face 153 of the second medium layer 15 at an angle of 61°, and be totally reflected by the side face 153 of the second medium layer 15. A light 05 is totally reflected back into the light guide body 11 when reaching the long edge 151, and is then repeatedly reflected until it reaches an inclined tail end of the light guide body 11 with a reflection effect, and at this moment, the angle of the light 05 is adjusted to some extent, so the light 05 may exit in the subsequent propagation process. For other lights with a small angle, the lights may exit after the angle of the lights is adjusted by the inclined tail end with the reflection effect.

Figure 4:
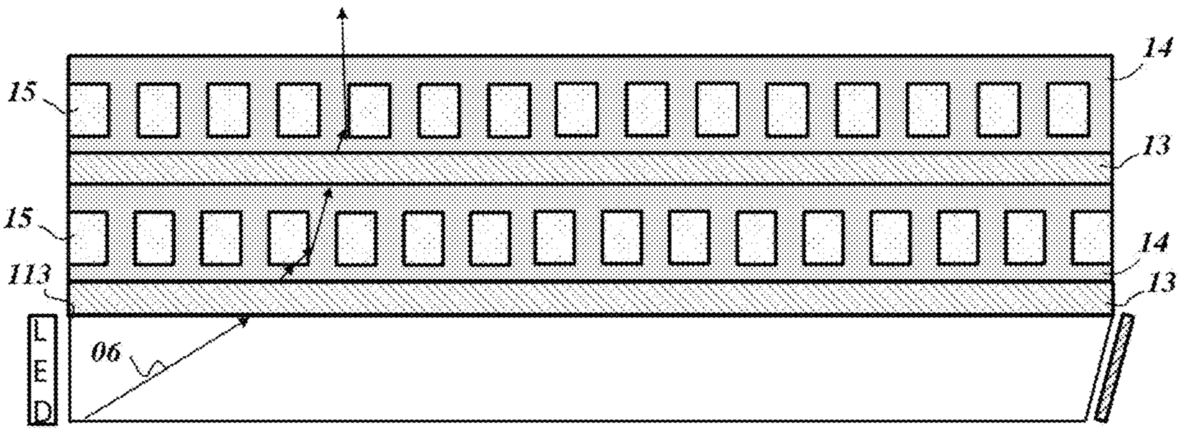
FIG. 4 is a schematic diagram of the structure and an optical path of an area light source device in a second embodiment of the present application.

In conjunction with FIG. 4, in a second embodiment, compared with the structure in FIG. 1, multiple stacked structural layers 14 are disposed on one side of the rear exit plane 113, second medium layers 15 are wrapped in each of the structural layers 14, and the second medium layers 15 are used for changing the direction of light from the light guide body 11 to the second medium layers 15, and emitting the light in a direction away from the rear exit plane, and the refractive index of the structural layers 14 is greater than the refractive index of the second medium layers 15.

In a preferred embodiment, the cross-section of each second medium layer 15 perpendicular to a plane direction of the structural layers is rectangular.

Further, first medium layers 13 are disposed between the adjacent structural layers 14, as well as between the light guide body 11 and the structural layers 14, and the refractive index of the light guide body 11 is greater than the refractive index of the first medium layers 13.

In this embodiment, the structural layers 14 are made of an optical material with a high refractive index, and the second medium layers 15 are made of an optical material with a low refractive index. The first medium layers 13 are also made of an optical material layer with a low infraction index, and the second medium layers 15 are rectangular. A light 06 exits the light guide body 11 with the refractive index lower than that of the structural layer, is transmitted by side faces of the second medium layer, and is refracted upwards. Then, the light 06 further passes through the next structural layer 14, so the emitted light will be better collimated. There may be many combinations similar to the sandwich structure.

Figure 5:
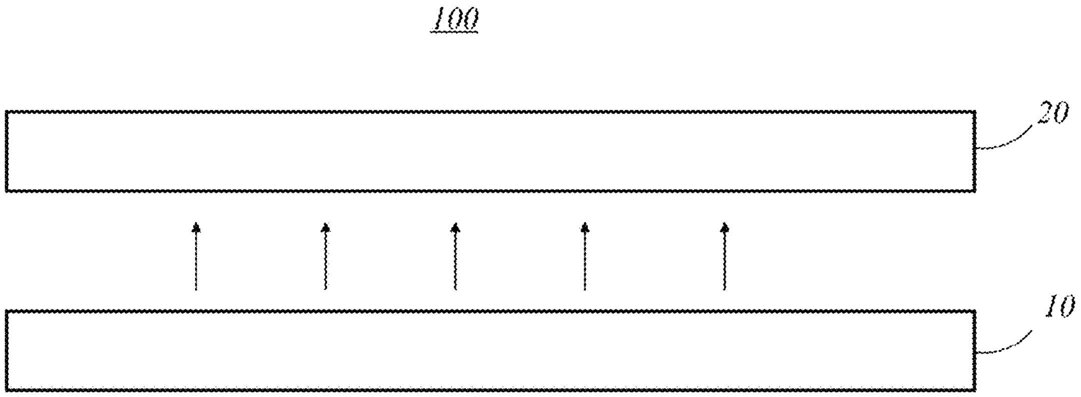
FIG. 5 is a schematic structural diagram of a flat panel display device in one embodiment of the present application.

In conjunction with FIG. 5, this embodiment discloses a flat panel display device 100, which comprises the area light source device 10 shown in FIG. 1-FIG. 4, and a panel 20 disposed one side of the rear exit plane.

To sum up, the structure in the invention can effectively reduce light leakage caused by reflection and improve the CR of front light sources without compromising the transparency, and the process feasibility is high.

For those skilled in the art, the invention is not limited to the details of the above illustrative embodiments, and can be implemented in other specific forms without deviating from the spirit or basic features of the invention. Therefore, the above embodiments should be construed as illustrative rather than restrictive. The scope of the invention should be defined by the appended claims rather than the above description, so all variations complying with the meanings of equivalent elements in the claims and the scope of the claims should be included in the invention. Any reference signs in the claims should not be construed as limitations of the claims involved.

In addition, it should be understood that although the invention has been described with embodiments, not every embodiment includes one independent technical solution, the way of narration in this specification is merely for the purpose of clarity, and those skilled in the art should regard this specification as a whole, and the technical solutions in different embodiments may be properly combined to form other embodiments that can be understood by those skilled in the art.

What is claimed is:

1. An area light source device, comprising:
- a light guide body comprising an incidence plane, and a front exit plane and a rear exit plane extending along two opposite sides of the incidence plane respectively;
- a light emitting body disposed along a side of the incidence plane of the light guide body;
- multiple structural layers disposed on a side of the rear exit plane, and used for changing a direction of light from the light guide body to the structural layers and emitting the light in a direction away from the rear exit plane;
- first medium layers disposed between the adjacent structural layers, as well as between the light guide body and one of the structural layers, wherein a refractive index of a material of the light guide body is greater than or equal to a refractive index of a material of the first medium layer, and the structural layer is bonded on a surface of the first medium layer parallel to the rear exit plane; and
- second medium layers wrapped in each of the structural layers,
- wherein a refractive index of a material of the structural layers is greater than a refractive index of a material of the second medium layers, the light guide body comprises a reflection plane opposite to the incidence plane, and an angle between the reflection plane and the rear exit plane is an acute angle,
- wherein a refractive index of a material of the light guide body is greater than a refractive index of a material of the first medium layers.

2. The area light source device according to claim 1, wherein the refractive index of the material of the structural layer is 1.65, and the refractive index of the material of the second medium layers is 1.33.

3. The area light source device according to claim 1, wherein the refractive index of the material of the light guide body is 1.58, and the refractive index of the material of the first medium layer is 1.48.

4. The area light source device according to claim 1, wherein a cross-section of each of the second medium layers perpendicular to a plane direction of the structural layer is a trapezoid, an edge, close to the light guide body, of the trapezoid is a long edge, and an edge, away from the light guide body, of the trapezoid is a short edge.

5. The area light source device according to claim 1, wherein the light guide body further comprises a reflector disposed along a side of the reflection plane.

6. The area light source device according to claim 1, wherein a cross-section of each of the second medium layers perpendicular to a plane direction of the structural layers is rectangular.

7. A flat panel display device, comprising an area light source device and a flat panel display panel disposed on a side of a rear exit plane, and the area light source device comprises:

a light guide body comprising an incidence plane, and a front exit plane and a rear exit plane extending along two opposite sides of the incidence plane respectively;

a light emitting body disposed along a side of the incidence plane of the light guide body;

multiple structural layers disposed on a side of the rear exit plane, and used for changing a direction of light from the light guide body to the structural layers and emitting the light in a direction away from the rear exit plane;

first medium layers formed between the adjacent structural layers, as well as between the light guide body and one of the structural layers, wherein a refractive index of a material of the light guide body is greater than or equal to a refractive index of a material of the first medium layer, and the structural layer is bonded on a surface of the first medium layer parallel to the rear exit plane; and second medium layers wrapped in each of the structural layers, wherein a refractive index of a material of the structural layers is greater than a refractive index of a material of the second medium layers, and the light guide body comprises a reflection plane opposite to the incidence plane, and an angle between the reflection plane and the rear exit plane is an acute angle, wherein a refractive index of a material of the light guide body is greater than a refractive index of a material of the first medium layers.

8. The flat panel display device according to claim 7, wherein the refractive index of the material of the structural layer is 1.65, and the refractive index of the second medium layers is 1.33.

9. The flat panel display device according to claim 7, wherein the refractive index of the material of the light guide body is 1.58, and the refractive index of the material of the first medium layer is 1.48.

10. The flat panel display device according to claim 7, wherein a cross-section of each of the second medium layers perpendicular to a plane direction of the structural layer is a trapezoid, an edge, close to the light guide body, of the trapezoid is a long edge, and an edge, away from the light guide body, of the trapezoid is a short edge.

11. The flat panel display device according to claim 7, wherein the light guide body further comprises a reflector disposed along a side of the reflection plane.

12. The flat panel display device according to claim 7, wherein a cross-section of each of the second medium layers perpendicular to a plane direction of the structural layers is rectangular.

* * * * *